United States Patent [19]

Hamann et al.

[11] Patent Number: 5,732,166

[45] Date of Patent: Mar. 24, 1998

[54] HIGH TEMPERATURE-RESISTANT OPTICAL SENSING APPARATUS AND METHOD OF MAKING

[76] Inventors: Oliver Hamann, Holzhaeuser Weg 41c, 21217 Seevetal; Reinhard Ulrich, Alte Rennbahn 2, 21244 Buchholz, both of Germany

[21] Appl. No.: 613,411

[22] Filed: Mar. 11, 1996

[51] Int. Cl.$^6$ .................................. G01J 5/48; G02B 7/00
[52] U.S. Cl. .................... 385/12; 356/43; 359/819
[58] Field of Search ........................ 385/12, 13, 88, 385/92, 93; 356/43, 44; 359/846–848, 819

[56] References Cited

U.S. PATENT DOCUMENTS

| | | | |
|---|---|---|---|
| 4,215,275 | 7/1980 | Wickersheim | 356/44 X |
| 4,223,226 | 9/1980 | Quick et al. | 356/44 X |
| 4,466,700 | 8/1984 | Christiansen et al. | 359/848 |
| 4,468,771 | 8/1984 | Zhukov et al. | 385/12 X |
| 5,191,388 | 3/1993 | Kilham | 385/12 X |
| 5,381,229 | 1/1995 | Murphy et al. | 356/345 |
| 5,450,245 | 9/1995 | Grotzinger et al. | 385/93 X |

*Primary Examiner*—John D. Lee
*Attorney, Agent, or Firm*—Christensen O'Connor Johnson & Kindness

[57] ABSTRACT

The invention provides an apparatus, and method of making the apparatus, for optical sensing of parameters in high temperature environments, such as chemical reaction zones, combustion zones, high temperature drying processes, and the like. Moreover, the optical apparatus of the invention are able to operate in high temperature environments without need for associated cooling equipment. The optical elements of the sensors are fabricated from a material that is refractory, is transparent to electromagnetic radiation, has low thermal conductivity, and that reduces in viscosity when heated to a temperature well above the operating temperature to which it will be subjected in the monitoring environment. Preferably, the optical elements, and even mechanical elements, are made of a vitreous silica material. This allows attachment of optical and mechanical elements to each other through a "direct adhesion" process whereby heat is applied in the region of adjacent surfaces of these elements causing reduction in viscosity of the vitreous silica, flowing and thereafter hardening to form permanent connections. Since vitreous silica has a low thermal conductivity, the locally applied heat does not substantially affect the optical properties of optical elements that are so treated for attachment.

20 Claims, 4 Drawing Sheets

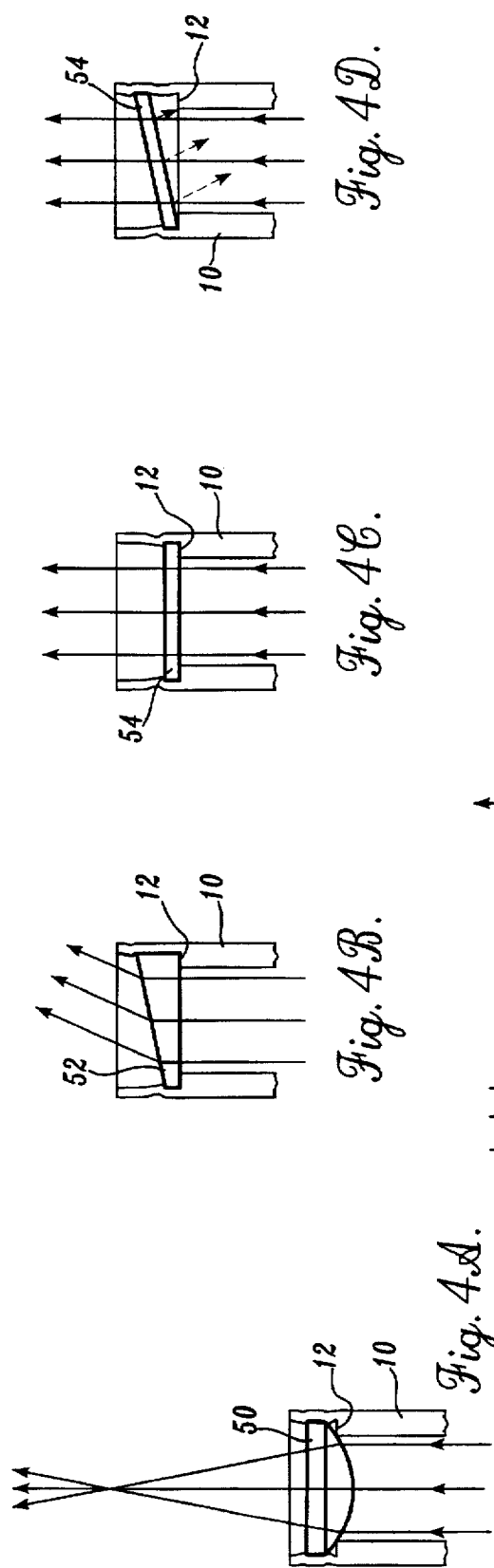
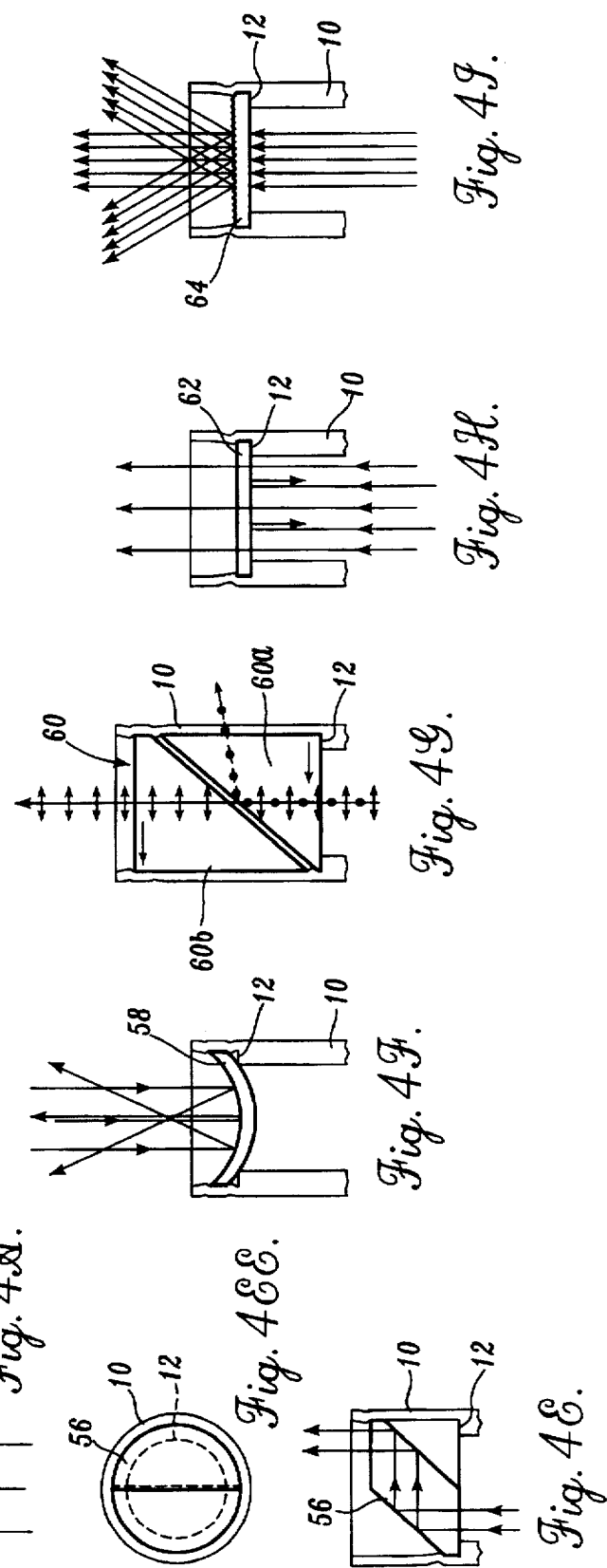

HIGH TEMPERATURE-RESISTANT OPTICAL SENSING APPARATUS AND METHOD OF MAKING

FIELD OF THE INVENTION

The invention relates to the field of sensing devices for the measurement of physical and chemical parameters, and more particularly, to optical sensing systems that are able to operate in high temperature environments, without need for associated cooling equipment.

BACKGROUND OF THE INVENTION

There are many applications in the materials processing industry where it is necessary to monitor and control the process to ensure that certain desired end products are produced and that the process operates efficiently. Sometimes these processes take place at high temperatures, for example processes such as steam generation, certain chemical reactions, combustion processes, drying processes, and cement clinker production.

While it is commonplace to monitor processes that take place in the low to medium temperature ranges using conventional equipment, as the process temperature increases, conventional equipment fails. For example, electrical systems fail in part because semiconductor devices fail at temperatures above about 150° C. Standard optical sensors are known to be useful at temperatures up to about 400° C. At higher temperatures, either the accuracy of the conventional optical sensor system falls below an acceptable limit, or the system itself deteriorates or fails completely. As a result of the temperature limitations of these sensors, the prior art has developed a technique of shielding the sensor from high temperatures and/or protecting the sensor with an associated cooling system, either through circulating coolant around the sensor, or locating the sensor within a cooled housing. The most commonly used coolant is water, although other coolants are also used. However, the use of such cooling systems is expensive. Usually, heat exchangers, pumps and other components are required. In addition, the use of a cooling system increases the probability of failure of the entire sensing system. The possibility of leakage in the cooling system sometimes necessitates an emergency retraction system to remove the apparatus from the process being monitored to avoid or minimize contamination of the process by leaking coolant.

There is a need for an apparatus that is able to monitor high temperature processes, such as chemical reactions, combustion reactions, and the like, without need for a coolant system, and without need for an emergency retraction system. Preferably, the apparatus should be of a type that would not pose a risk of contamination of the process being monitored. Moreover, the apparatus should preferably require minimal maintenance and should be capable of remaining in service without requiring frequent adjustment. Finally, the apparatus should be relatively inexpensive so that it would be cost effective to use commercially.

SUMMARY OF THE INVENTION

The invention provides an apparatus, and method of making the apparatus, for sensing parameters of high temperature processes, including such processes as chemical reactions, combustion processes, cement clinker production, and the like. The apparatus does not require associated cooling apparatus and is able to withstand high temperatures with minimal maintenance or adjustment while maintaining accuracy. Moreover, the apparatus is inert, and therefore does not pose a risk of contamination of the process being monitored. The method of making the apparatus is unique and contributes to the reliability of the apparatus in service conditions.

The optical apparatus of the invention includes a first high temperature-resistant component for providing an illuminating beam of electromagnetic radiation, such as infrared, visible, or ultraviolet light, and the like. This component includes at least one optical element, such as a lens, prism, mirror, waveguide, window, polarizer, and the like, that is preferably made from a high temperature electromagnetic radiation-transparent material, such as the vitreous silica. The optical element is supported, preferably through attachment by a direct adhesion process of the invention, to a support member of the apparatus and is aligned to project a beam of radiation into a zone or volume of the process to be monitored. A second component of the apparatus is also high temperature-resistant, and is designed for observing activity in the volume of the process to be sensed. This volume is defined by the intersection between the illuminating beam provided by the first component, and a focal region of the second component. The second component also includes an electromagnetic radiation-transparent optical element that is supported, preferably by direct adhesion, by a support member of the second component. Incoming radiation is focused by the optical element of the second component into a carder, such as an optical fiber made of a high temperature-resistant material, for observation.

Of course, the optical apparatus of the invention may have only one component, or more than the two components explained above. The single component apparatus is useful, for example, in viewing a combustion zone where electromagnetic radiation for viewing is supplied by the combustion process itself. Thus, the single component includes an electromagnetic radiation-transparent optical element supported, preferably by direct adhesion, by a support member. Preferably, the support member forms a housing that surrounds the optical element. Incoming electromagnetic radiation is focused by the optical element into a carder, such as an optical fiber, made of a high temperature resistant material, preferably vitreous silica.

The method of making the high temperature-resistant sensors, in accordance with the invention, includes selecting a suitable optical element that is resistant to the high temperature to which it will be subjected under process operating conditions, and placing the optical element on, or within a small clearance distance of, a support member, similarly fabricated of a material able to withstand process temperature conditions, such as a refractory material. The region of closest approach between the optical element and the support is then heated to a temperature sufficient to cause the peripheral edge of the optical element nearest the support, or the portion of the support nearest the optical element, or both, to become less viscous and flow to encroach across any clearance space between them so that a contacting bridge is formed between the support and the optical element by surface tension of the reduced-viscosity material. The bridged support and optical element is then allowed to cool so that the bridge hardens into place and the optical element is permanently affixed to the support at the desired location. In accordance with the invention, the optical properties of the optical element are substantially unaffected by this heating and joining process.

In certain embodiments of the method, particulates of vitreous silica, or another refractory material that is able to become less viscous and flow to some extent at very high temperatures, are added at the contact zone between the optical element and the support, or into the clearance space between the two so that these particulates flow to some extent upon heating to form a bridge between the optical element and the support. Upon cooling, the bridge, initially held in place by surface tension when hot, solidifies so that the element is permanently affixed to the support.

Alternatively, in accordance with the invention, an optical element is placed in position in a support, and a region encompassing a peripheral edge of the optical element and a nearby wall of the support is heated to a temperature that causes the viscosity of the wall to reduce. Under these conditions, the wall at the periphery of the optical element gradually shrinks inward toward the peripheral edge of the optical element, forming wells or bulges above and below the peripheral edge. Upon cooling, this deformation of the surrounding walls hardens and mechanically holds the optical element in place in the support. This "shrink fit" method of the invention is exemplified in FIGS. 3A and 3B, and is explained below.

While the above summary of the invention more particularly describes optical sensors, it is within the scope of the invention to apply the techniques disclosed to a variety of other types of sensors that are in use in high temperature environments. Importantly, the apparatus of the invention are able to operate in high temperature environments without requiring associated cooling equipment such as coolants, pumps, heat exchangers, and like equipment.

BRIEF DESCRIPTION OF THE DRAWING

The foregoing aspects and many of the attendant advantages of this invention will become more readily appreciated as the same becomes better understood by reference to the following detailed description, when taken in conjunction with the accompanying drawings, wherein:

FIG. 4A–I show schematic partial views, in cross section, of embodiments in accordance with the invention where optical elements are shrink-fit into a surrounding support holder so that electromagnetic radiation is focused, redirected, polarized, or otherwise manipulated by the optical element.

DETAILED DESCRIPTION OF THE PREFERRED EMBODIMENT

Figure 1:
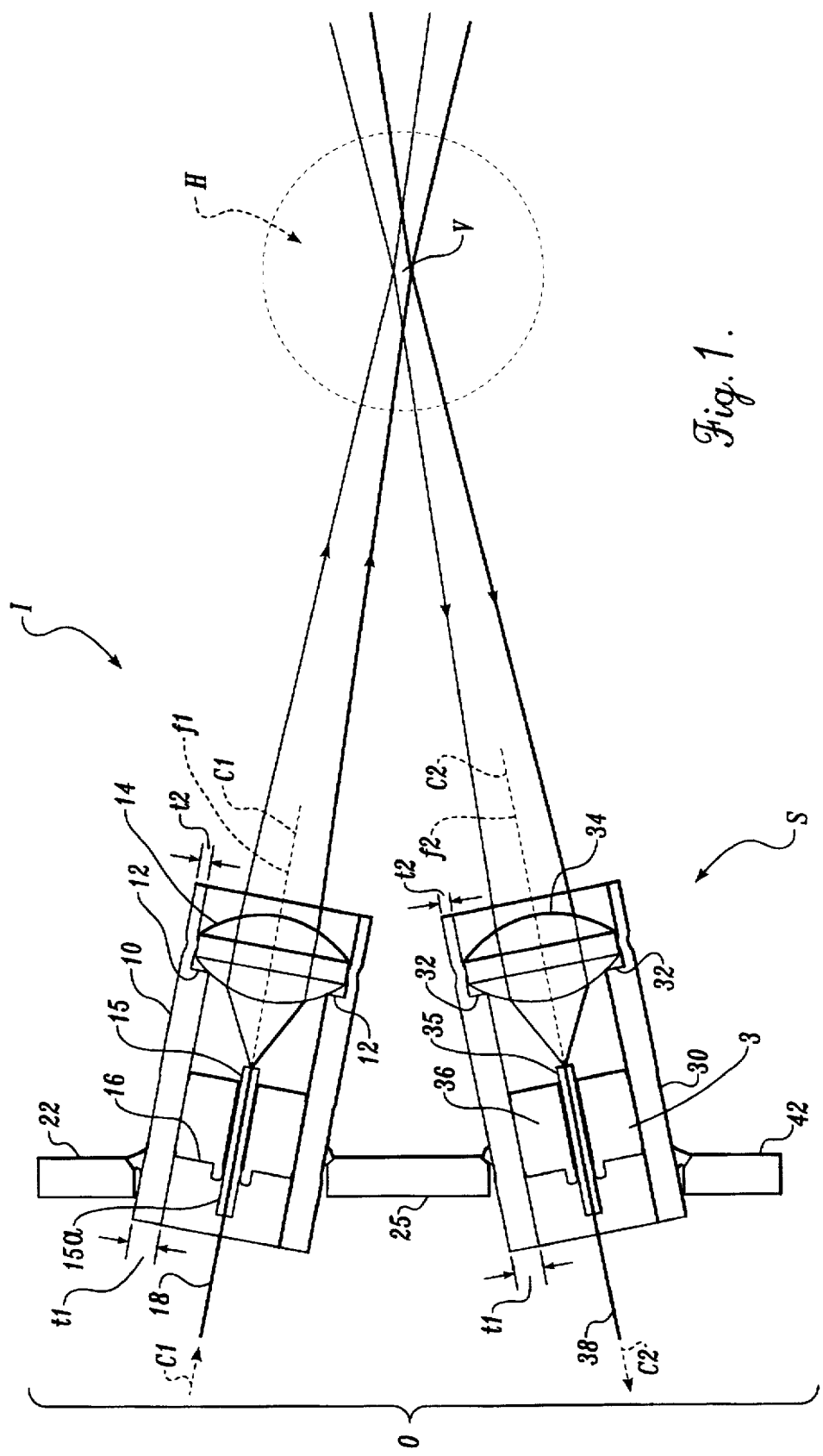
FIG. 1 illustrates schematically, in cross section, a preferred embodiment of an optical system of the invention.

The optical sensing apparatus of the invention includes two types of elements that are described by the function they perform: optical and mechanical elements. The optical elements modify the propagation of electromagnetic radiation, such as visible, infrared and ultraviolet light. Typical elements of the optical components are lenses, prisms, gratings, mirrors, planar and fiberoptical waveguides, windows, and polarizers. Mechanical elements typically are means to hold the optical elements in prescribed arrangements necessary for the optical elements to perform their function. In certain instances, the optical elements can also serve as mechanical elements, depending on their arrangement within the system. The materials selected for each of the elements depends on the function of the optical apparatus and, in accordance with the invention, the temperature to which the optical components are to be subjected. In a most preferred embodiment, the optical and mechanical elements are of the same refractory material, joined as explained below, by "direct adhesion" or heat-induced "shrink fit." This minimizes stresses in the apparatus that arise when the elements are of materials that have differing coefficients of expansion, particularly during cycles of rapid cooling and rapid heating.

In accordance with the invention, the optical sensing apparatus is of a type that is resistant to, and that may therefore be effectively used, in a high temperature environment without requiring associated cooling equipment. The term "high temperature", as used in the specification and claims, with reference to the environment within which the apparatus of the invention functions, refers to temperatures above 400° C., usually in the range from about 400 to about 2500° C., preferably from about 400° C. to about 1200° C. Thus, the materials that are useful for making the apparatus of the invention are able to withstand these temperature conditions. Clearly, the apparatus is also useful at lower temperatures but it is able to operate at these high temperatures without requiring cooling or shielding from the heat.

The preferred optical elements of the invention are those that are not only able to withstand high temperatures, but are also substantially transparent to the type of electromagnetic radiation that is used for the sensing function. Preferably, the optical elements also have a relatively low coefficient of thermal expansion, and preferably a uniform or predictable coefficient of thermal expansion to minimize distortion. Moreover, the material with low thermal coefficient of expansion is resistant to thermal shocks so that it could be rapidly and repeatedly cooled down to ambient temperature (or temperatures approaching ambient) and then reheated to the temperature of the environment within which it operates, without failure due to thermal shock. Such temperature cycling may occur when the process is stopped or when the sensor must be removed from the high temperature environment. The optical elements are also substantially inert to the process being monitored.

The most preferred embodiment of the present invention includes optical elements of a glass-like refractory material, such as vitreous silica. Most preferably, all components of the apparatus, including both optical and mechanical elements, are fabricated from this glass-like refractory material. Vitreous silica is available from a number of manufacturers, for example General Electric Corporation. Vitreous silica is commercially available under a variety of brand names, for example HOMOSIL, HERASIL, SUPRASIL, and VYCOR. These available varieties of vitreous silica differ in their methods of production and relative purity. The term "vitreous silica," as used in the specification and claims, encompasses all of these brand-named vitreous silica materials, as well as other vitreous silica materials that have the desired optical properties and that are able to withstand operation within the contemplated high temperature environment.

The invention may be better understood with reference to the accompanying figures, each of which schematically represents an embodiment, or an aspect of the invention. Clearly, the figures and their descriptions are an aid to understanding the invention and do not limit the scope of the invention that is disclosed throughout this document.

FIG. 1 illustrates schematically an optical sensing apparatus in accordance with the invention. The optical sensor O includes an illuminating component I and an observing component S. Each of the components is defined by an outer substantially cylindrical housing, 10 and 30 respectively, of refractory material. The housings are joined together by a base B that includes a bridging section 25 extending between and joining the housings so that axes of symmetry C1, C2 of the housings intersect at a location within the high temperature environment H to be monitored. In a most preferred embodiment, the cylindrical housings 10 and 30 are each fabricated from vitreous silica, and the base is optionally of the same material. The base, illustrated as a planar bracket, has two throughbores, each sized to fit one of the two components of the optical sensor. A bridge section 25 extends between the two components when they are fitted through the throughbores, and connecting brackets 22 and 42 extend outward from the illuminating component I and the observing component S, respectively. The base is firmly attached to the optical components, thereby holding the components in place so that the respective axes of symmetry, C1, C2, intersect at a predetermined location. The base is attached to outer cylindrical surfaces of the housings by placing particulates of vitreous silica at spaces between edges of the bores of the base and the housings. The particulates are then heated to a temperature at which the particulates melt and flow to form bridges held in place by surface tension between the edges of the base and the housings 10 and 30. Upon cooling, these liquid bridges harden (increasing viscosity) so that the two housings are permanently affixed to the base B. Details of this "direct adhesion" method of the invention are explained below. The term "direct adhesion," as used in the specification and claims, refers to adhering one element of the apparatus of the invention to another, using either a method of reducing the viscosity of one component by heating so that it flows and forms a bridge with the other component upon cooling, or using a method that includes placing refractory particulates, such as vitreous silica particles, at contacting interfaces, or clearance spaces between surfaces to be joined, and heating the particulates until they melt and form bridges that join the two surfaces by surface tension. Upon cooling, the molten bridges harden and form connecting bridges between the two surfaces. As explained above, this method minimizes stresses at joints caused by temperature cycling when materials have different coefficients of thermal expansion.

The housing of the illuminating component has a thickness t1 that reduces, by a step change that forms an annular wall 12, to a thickness t2 at a front end of the housing thereby increasing the inner diameter of the housing at that end. An optical element, in this case, a disk-shaped lens 14, of electromagnetic radiation transparent refractory material, and sized with a diameter to just fit inside the wider end of the housing, abuts against the wall 12 and is affixed in the front end of the housing, as will be explained later. The focal axis of the lens f1 is aligned with and coincides with the central axis of the housing 10. A refractory optical fiber 18 extends into the housing 10 and is aligned along the central axis of the housing by passing through a capillary 15 affixed in a central throughbore of a holder 16 of refractory material located in the cylindrical housing behind the optical element. As a result, electromagnetic radiation traveling along fiber 18 passes through lens 14 and is focused by the lens to illuminate a volume V within the high temperature environment H to be monitored.

In the embodiment shown, a cylindrical plug holder 16 of vitreous silica was formed, with a central throughbore. A capillary 15 sized to fit into the throughbore was shrink fit into the bore, as explained below. The silica fiber 18 was inserted into the throughbore of the capillary, and permanently affixed by a small shoulder 15a of the capillary. This was achieved by rotating the plug while applying heat to the shoulder 15a until the viscosity of the shoulder 15a was reduced and a portion thereof flowed onto the surface of the vitreous silica fiber 18. Upon cooling, the flowed vitreous silica hardened and was tightly adherent to the fiber 18. The plug was then inserted into the throughbore of the cylindrical housing 10 and light was applied through the fiber, through lens 14. The distance from the tip of the fiber to the lens 14 was adjusted by adjusting the distance between the plug and the lens. When the lens was in focus, the region of the tube 10 surrounding the plug was heated until the viscosity of the tube reduced to the point that the tube shrank marginally around the plug. Upon cooling, the plug was held in a "shrink fit" in the housing at the desired distance from the lens.

The sensing component S, as explained above, is also surrounded by a refractory cylindrical housing 30 and is constructed similarly. Like the housing of the illuminating component, the housing of the sensing component has a thickness t1 that reduces stepwise to increase the inner diameter of the housing near its front end, forming an annular wall 32, to a thickness t2. An optical element, such as a lens 34, is affixed in the increased diameter section of the tubular housing, as will be explained later, such that the focal axis f2 of the lens coincides with a central axis C2 of the housing. An optical fiber 38 of refractory material extends into the housing 30, and is supported in a capillary 35 held in a throughbore of the holder 36 that coincides with the central axis c2 of the housing 30. Thus, the longitudinal axis of the fiber coincides with the focal axis f2 of the lens 34.

As explained above, the illuminating and sensing components are joined by a base B such that electromagnetic radiation from the illuminating sensor I crosses the path of the focal range of the sensing component S to define a volume V within the high temperature zone H being monitored. Thus, electromagnetic radiation from that volume travels through lens 34 and is focused into optical fiber 38 for analysis, and further observation, as required.

Clearly, by carefully selecting the angle of the central axis C1 of the illuminating component I relative to the central axis C2 of the sensing component S, and the focal lengths of the lenses 14 and 34, the distance that the sensor should be placed from a desired volume to be observed can be determined. Thus, a larger angle between the axes implies a shorter distance between the optical sensor and the volume V being observed. Brackets 22 and 42 of the base B, on outward sides of housings 10 and 30, respectively, assist in mounting the apparatus in the zone H and are preferably also of refractory material.

In a most preferred embodiment of the invention, the lenses 14 and 34, and the tubular housings 10 and 30, as well as the optical fibers 18 and 38 are fabricated from vitreous silica. In other embodiments, only the materials that must be transparent to the radiation, i.e., the lenses 14 and 34 and the optical fibers 18 and 38, are of vitreous silica. The housing and support for the silica fiber, the bridge 25 and brackets 22 and 42 may be fabricated from another refractory material, or a heat resistant metal. Importantly, since vitreous silica has a known, low coefficient of thermal expansion ($k=5\times 10^{-7}/°C.$), dimensions of the apparatus can be predetermined so that when the apparatus reaches the high temperature at which it will operate, then all dimensions are optically correct for best focusing of the radiation.

Clearly, in certain embodiments of the invention, an illuminating component I is not required. For example, when the process being monitored supplies electromagnetic radiation in a wavelength so that the process can be monitored using this radiation. For example, a combustion process, or a chemical process that releases electromagnetic radiation, could be monitored using only the sensing component S, described above and shown in FIG. 2. Thus, electromagnetic radiation from the process being monitored is focused through the optical element, and ultimately enters into an optical fiber that carries the radiation to an observer.

Figure 2A:
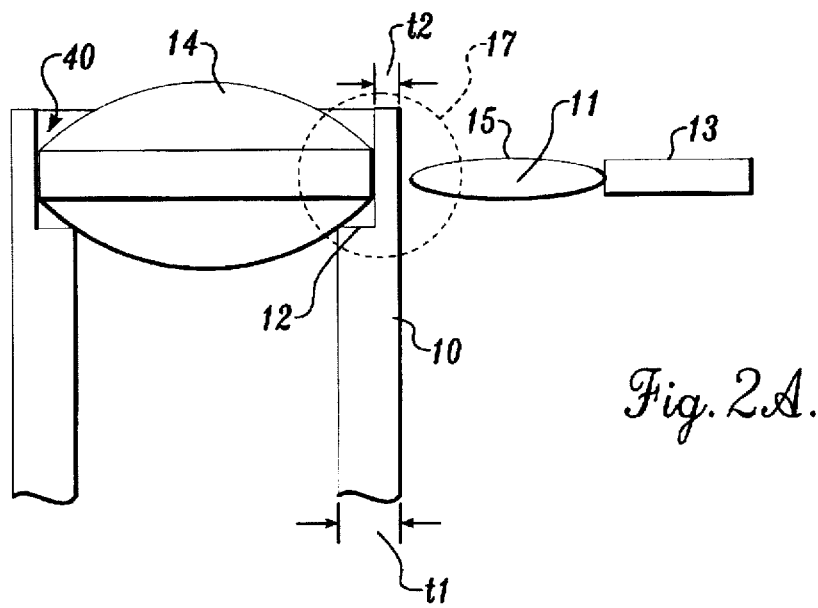
FIGS. 2A–2C illustrate schematically, in cross section, three stages of a direct adhesion method of connecting two components made of a refractory material, in accordance with the invention.
Figure 2B:
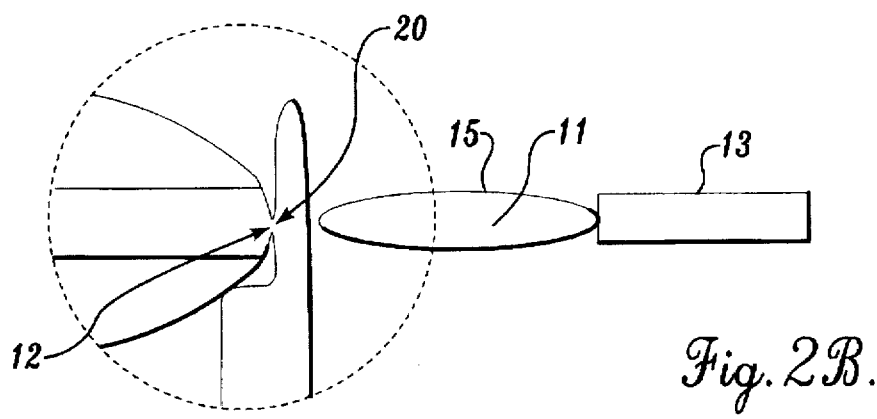
Figure 2C:
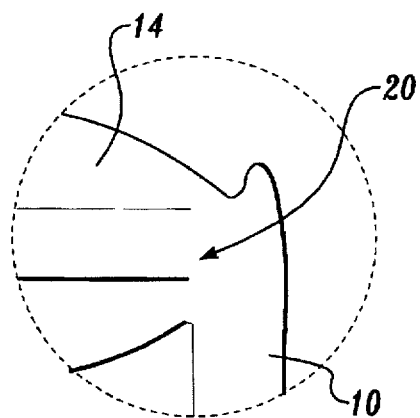

FIG. 2A illustrates schematically a first step in the method according to the invention of attaching an optical element to a support in order to fabricate an apparatus in accordance with the invention. In this instance, the optical element is a lens 14, although other optical elements, as explained above, can also be attached using the procedures explained below. In the embodiment shown, the tubular housing 10 has a thickness t1 that is reduced stepwise to a thickness 12 at its front end thereby increasing the inner diameter of the housing. This stepwise reduction forms an annular laterally extending wall 12. The disk-shaped lens 14, having a diameter the same or slightly smaller than the inner diameter of the front end of the housing, is inserted into the front end of the housing. In the illustration, the lens is sized so that there is a minimal clearance space 40 extending between the outer circumferential edges of the lens and the inner walls of the housing 10 when the lens rests on the annular wall 12. A heat source 13, such as an oxyhydrogen torch (flame up to 3000° C.) provides heat 15 to a region 17 that includes a circumferential portion of the lens and that portion of the front end of housing 10 that has the reduced thickness. As shown in FIG. 2B, when sufficient heat is applied, and the temperature rises to a level that causes the refractory material of the lens 14 or the housing 10 to reduce in viscosity, then material flows, in this instance from the surrounding inner wall, through the clearance space 40 and into direct contact with the lens 14. Thus, a bridge 20 of molten material is formed and held in place by surface tension effects. As heating continues, a further portion of the wall and/or the lens flows until a complete bridge 20 is formed that fills the space between the annular wall 12 and the lens. Upon cooling, the lens 14 is permanently attached to the housing 10 by a broad bridge 20. Importantly, since vitreous silica is a poor heat conductor, central areas of the lens are not affected by heating peripheral edges so that optical properties are substantially unaffected.

Figure 3A:
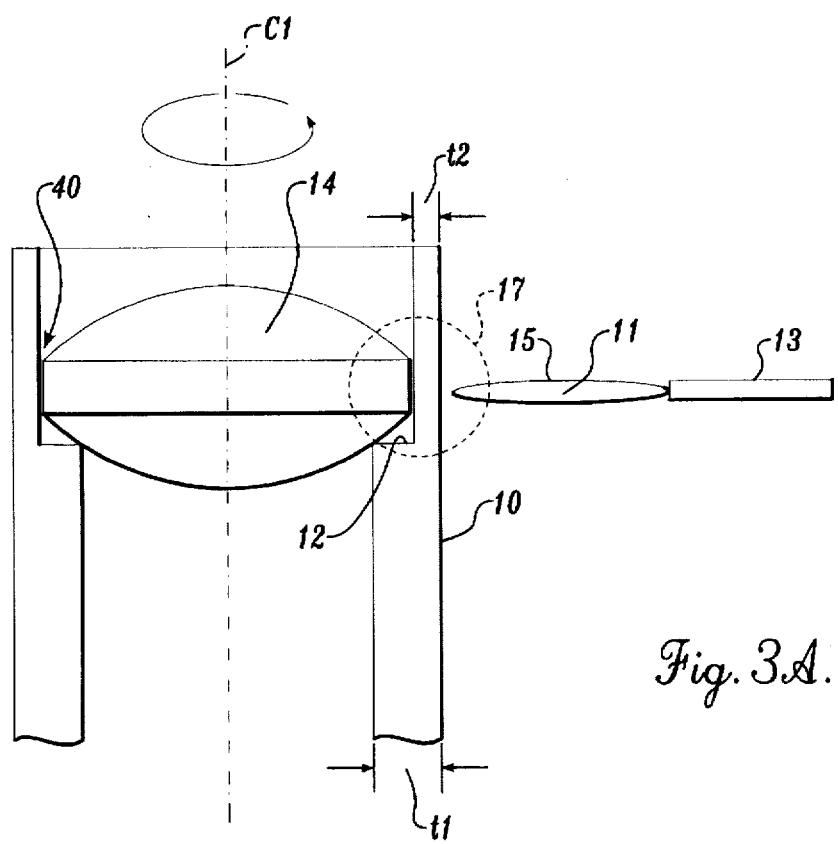
FIGS. 3A–3B illustrate schematically, in cross section, an embodiment of the method of the invention for connecting two components of an optical system using a shrink-fit technique.
Figure 3B:
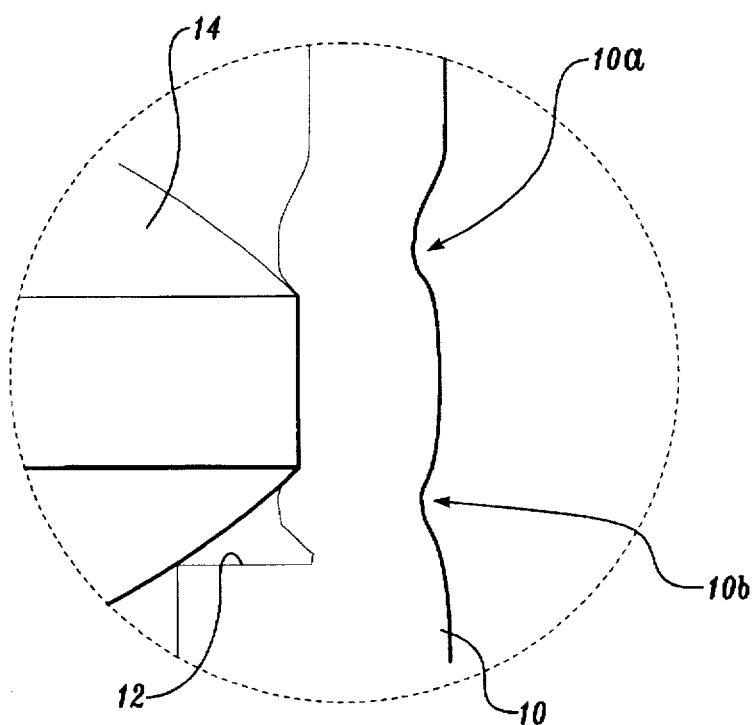

In an alternative embodiment of the method of the invention, illustrated in FIGS. 3A and 3B, the lens is also placed in a forward section of increased internal diameter created in housing 10 by a stepwise reduction in the thickness of the wall of the housing. In this instance, however, the housing is rotated about its central axis C1 while heat 15 is applied from a source 13 to a region that encompasses the thinned wall, a clearance space 40 between the wall and the lens, and the circumferential edge of the lens 14. As a result of such heating, the viscosity of the wall is reduced so that it tends to shrink inward locally forming slight wells or bulges 10a, 10b above and below the circumference of the lens 14. The wells surround the entire circumference of the lens so that the lens is firmly held in place against the annular wall 12.

FIGS. 4A–I, illustrate other embodiments of the optical element shrink-fit into a cylindrical holder. In FIG. 4A, the refractory optical element is a disk-shaped planoconvex lens 50 oriented with the peripheral circumferential portion in contact with the wall 12 of the cylindrical holder 10. Upon heating the circumference of the holder 10 in the vicinity of the periphery of the planoconvex lens, the holder shrinks around the edges of the lens, as described above, to form wells or bulges above and below the peripheral edges of the lens. Upon cooling, the wells harden so that the lens is firmly affixed in place.

In FIG. 4B, a disk-shaped refractory prism 52, made of vitreous silica or refractory crystalline material, is placed in the front end of the holder 10, such that peripheral edges of the flat base rest on the internal walls 12 of the holder. Once again, heating the holder in the vicinity of the peripheral edges of the prism causes shrinking of the prism inward to form wells above the edges of the prism. Upon cooling, these wells harden to hold the prism in place.

FIG. 4C shows a disk-shaped refractory window 54 shrink-fit into the front end of a cylindrical holder 10. The planar window is fitted into the holder so that its peripheral edges rest on internal walls 12 of the holder. Shrink-fit is then accomplished as explained above with reference to FIGS. 4A and B.

FIG. 4D also illustrates a refractory window 54 in the front end of the holder 10. This window is, however, mounted at an angle so that only one peripheral edge rests on the internal wall 12 of the holder, while the other edge rests against a thin portion of the cylindrical wall of the holder. Once again, heat is applied to the holder in the vicinity of the peripheral edges of the window. As explained above, the window is then shrink-fit into the holder.

FIG. 4E illustrates a double prism 56 of refractory material used as an optical element and affixed in the front end of a cylindrical holder 10. The prism has a planar base in the form of a semi-circle, and peripheral edges of the semi-circle rest on inner wall 12 of the holder 10. The sides of the prism extend at an angle upward from the base to a planar face, also in the form of a semi-circle. The circumferential edges of the semi-circular upper face rests against a thinned portion of the cylindrical inner wall of the holder 10, at a position opposite to the semicircular base of the prism, as seen more clearly in the top view, FIG. 4EE. As before, heat is applied to the holder in the vicinity of the peripheral edges of the prism. As a result, the prism is shrink-fit in place.

FIG. 4F illustrates a mirror 58 held in place, by shrink-fit, in the front end of a holder 10. In this instance, the mirror is concave, although convex ellipsoidal, flat, and other nonspherical shapes are also useful. The mirror is preferably coated with a metal layer, or multi-layer, for full reflection. Coatings such as titanium oxide, silicone oxide, or silicone nitrite, and other high-temperature resistant coatings can be laid onto the mirror by evaporation, chemical vapor deposition, spotter process, and the like. The metal coating used depends upon the temperature at which the optical apparatus will be used. Useful metals include aluminum, gold, silver, and the like. As shown, the refractory disk-shaped mirror is placed in the front end of the holder 10 so that peripheral edges of its curved surface rests on the inner walls 12 of the holder. Heat is applied, as described above, to shrink-fit the mirror in place.

FIG. 4G illustrates a polarizer 60 of the Glan-Thompson-type, affixed by shrink-fit into the front end of a holder 10. The prisms of the polarizer are made of a refractory material, such as vitreous silica or a crystalline material. As shown, the lower of the two refractory prisms 60a has a disk-shaped planar base with peripheral edges thereof resting on the inner walls 12 of the holder 10. The upper prism 60b has a surface parallel to the angled upper surface of the lower prism, and is spaced from the lower prism to provide an air gap. In order to fix the polarizer in place, heat is applied near the peripheral edges of the base of the lower prism to cause a shrink-fit, as described above. Heat is also applied near the upper edges of the upper prism to cause a second shrink-fit holding the upper prism in place.

FIG. 4H illustrates the use of a refractory optical element that is a partially reflective mirror, or a spectral filter 62. This disk-shaped refractory mirror or filter is adhered in place, by shrink-fit, as explained above for FIG. 4C. As shown, during operation, light of wavelengths $\Sigma_1$ and $\Sigma_2$ are incident on the filter or mirror, and only light of wavelengths $\Sigma_1$ passes through.

FIG. 4I illustrates a disk-shaped refractory deflection grating 64 affixed by shrink-fit into the front end of a holder 10. This deflection grating divides incoming light, shown as parallel lines, into separate beams, traveling at predetermined angles to the incident light. The deflection grating is adhered by direct adhesion, in a similar fashion to the description for FIG. 4C.

While the above FIGS. 4A–I illustrate the use of the shrink-fit technique, clearly, direct adhesion is also feasible and can also be used in these application, as described above.

The following example is illustrative of the invention and does not limit the scope of the invention, as described above and claimed herebelow.

EXAMPLE

Optical sensors of the invention, like those illustrated in FIG. 1, were fabricated from vitreous silica. These optical sensors were operated at temperatures of up to 870° C., for at least four weeks. Inspection after this time indicated that there was no measurable deviation from the initial adjustment of the optic elements. The optical sensors are stable in the high temperature environment.

In each case, the vitreous silica lens was disk-shaped and biconvex having a diameter of 12.7 mm and a focal length of 10 mm at room temperature, for an electromagnetic radiation wavelength of 830 nm. The tubular housings, 10 and 30, each had an inner diameter of 12 mm, an outer diameter of 14 mm, and a length of about 45 mm. The optical fibers 18 and 38 were each all-silica multimode fiber having a core diameter of 200 microns, each was clad with a cladding having a diameter of 240 microns, and covered with a gold coating 15 microns thick. The optical fibers were inserted into holders 18 and 38, each having an outside diameter of 11.9 mm, centrally bored with throughbores of diameter 3.1 mm.

A forward end of each of the vitreous silica cylindrical tubes 10 and 30 were milled to an inside diameter that allowed the lens to fit into the annular space. The lenses were rested against annular walls 12 and 32, respectively, and an oxyhydrogen flame, with temperatures up to 3000° C., was used to locally heat the areas where the edges of the lenses were closest to the milled surfaces of the tubes. This localized heating led to contraction of the tubes in the heated region, due to surface tension, and where the lenses and tubes touched, they flowed together. Upon cooling, a stable connection was formed between each lens and its respective cylindrical tube support.

The vitreous silica fiber holders 16 and 36 were fabricated by inserting vitreous silica capillaries 15, 35 into the central throughbores of the plugs. Small shoulders 15a and 35a of the capillaries 15 and 35, respectively, extended beyond the throughbores of plugs 16, 36, respectively. The fiber holders were heated in the vicinity of the capillaries to fuse the capillaries to their respective holders. The optical fibers 18, 38 were inserted into capillaries 15, 35, respectively. Once the fiber was in place in the capillary, the small shoulder of each capillary was heated to reduce the viscosity thereof. As a result, the small shoulders contracted, and upon cooling, held the fibers in place by a shrink fit.

The holder plugs 16 and 36 were then mounted, with their associated fibers into their respective cylindrical holders, 10, 30. Light was coupled to fiber 18 and the image formed by lens 14 was observed. The location of the holder plug 16 in the tube 10 was adjusted so that the focusing distance of the optics was 60 mm, and the diameter of the beam in focus was 1 mm. Once this position was found, the region of the tube surrounding the plug was heated. The resultant contraction of the tube 10 held the plug in place. The holder 36 was likewise located in tube 30.

A vitreous silica base plate was prepared by drilling two holes a distance of 30 mm apart, each having a diameter of 16 mm. This diameter is substantially greater than the outer diameter (14 mm) of the tubes 10, 30 to permit space for tilting and adjusting each optic component when it is inserted through the holes. The optics were then tilted so that their focal regions would overlap to form a volume V. The adjustment of the optics was verified by a closed circuit camera. The optic components were then affixed by the direct adhesion method of fusion to the base plate by silica bridges at three points around the circumference of each holder. Since the optic components and the base plate were not in direct contact, small pieces of fused silica (such as silica fiber) were placed in these clearance spaces between the optical components and the base plate. These particles were heated until they melted to form liquid bridges between nearby surfaces of the base plate and the outer surfaces of the cylinders 10 and 30, held in place by surface tension. Upon cooling, the liquid increases in viscosity or hardens to form solid bridges. The optics can be fine-tuned by careful heating of these silica bridges and the applying of light force, to adjust the optics slightly until focal regions overlapped perfectly, as shown in FIG. 1. The central portion of the base plate then formed the bridge 25, while the edges of the base plate formed the mounting brackets 22 and 42, also as shown in FIG. 1. The optical sensors were then mounted in a steel housing and tested in an environment of temperatures ranging up to 870° C. for at least four weeks, as explained above, without cooling apparatus or shielding from the heat.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An optical apparatus for use in a high temperature environment, the apparatus comprising:
   (a) a first component for providing an illuminating beam of light, the first component comprising:
      (i) a first optical element comprising a body of vitreous silica,
      (ii) a first support for the first optical element, the element affixed to the support by direct adhesion of the vitreous silica body to the support; and
   (b) a second component for observing activity in a volume to be monitored in the high temperature environment, the second component comprising:
      (i) a second optical element comprising a body of vitreous silica, and
      (ii) a second support for the second optical element, the second optical element is affixed to the second support by direct adhesion of the vitreous silica body to the second support;

wherein an intersection between an illuminating beam provided by the first component and a focal region of the second component defines a volume of the high temperature environment to be monitored.

2. The optical apparatus of claim 1, wherein the first support for the first optical element comprises a body of vitreous silica.

3. The apparatus of claim 1, wherein the first component is connected to the second component by a bridge of refractory material.

4. The apparatus of claim 1, wherein the first support of the first optical element comprises a cylindrical tube, and the first optical element comprises a disk-shaped lens having vitreous silica lens body, the lens affixed to an inner surface of the tube at a predetermined location by direct adhesion of the vitreous silica lens body to the tube.

5. The apparatus of claim 4, wherein the tube is comprised of vitreous silica.

6. The apparatus of claim 1, further comprising a vitreous silica optical fiber, the fiber transmitting a beam of light to the first optical element so that the optical element projects a focused illuminating beam of light into the high temperature environment.

7. The apparatus of claim 6, wherein the silica fiber is coated with a thin layer of gold.

8. An optical apparatus for use in a high temperature environment, the apparatus comprising:
(a) a first component for providing an illuminating beam of electromagnetic radiation, the first component comprising:
(i) a cylindrical housing of refractory material having a throughbore, the throughbore having a wider diameter at a forward end thereof, the wider diameter section terminating in an annular wall;
(ii) a disk-shaped lens of refractory material located in the forward end of the housing, a surface of the lens abutting against the annular wall of the housing; and
(iii) an illuminating optical fiber comprising a refractory material mounted to project a beam of illuminating electromagnetic radiation along a central axis of the housing, the central axis of the housing coincident with the focal axis of the lens; and
(b) a second component for observing activity in a volume to be monitored in the high temperature environment, the second component comprising:
(i) a second cylindrical housing of refractory material having a central throughbore, the throughbore having a wider diameter at a forward end thereof, the wider diameter section terminating in an annular wall;
(ii) a second disk-shaped refractory lens located in the forward end of the second housing, a surface of the second lens abutting against the annular wall of the second housing; and
(iii) an optical fiber of refractory material for observing electromagnetic radiation, the fiber comprising a refractory material, the fiber mounted to intercept electromagnetic radiation focused through the second disk-shaped lens;

wherein an intersection between an illuminating beam of electromagnetic radiation provided by the first component, and a focal region of the second component, defines a volume of the high temperature environment to be monitored.

9. The apparatus of claim 8, wherein the housing of the first component and the housing of the second component are mounted to a refractory base such that the first and second components are angled towards each other so that an illuminating beam from the first component is observable through the observing optical fiber of the second component.

10. A method of making an optical apparatus for use in a high temperature environment, the method comprising:
(a) selecting an optical element comprising a refractory body transparent to electromagnetic radiation;
(b) placing the selected optical element to within a predetermined clearance of a support for the element, the support comprising a refractory material having reduced viscosity when heated to a temperature exceeding the temperature of the high temperature environment;
(c) applying sufficient heat to a region comprising a clearance space between the body of the optical element and the support to cause a portion of the support to become less viscous and encroach across the predetermined clearance to contact the optical element to form a bridge held in place by surface tension, said sufficient heat applied without significant heat-induced distortion of the optical properties of the optical element; and
(d) allowing the heated region to cool so that the bridge hardens and the optical element is affixed to the support.

11. The method of claim 10, wherein the optical element is a lens, the support is cylindrical with an end having a diameter approximating the diameter of the lens, the end of the support terminating in an annular wall; and the applying of heat is sufficient to cause a portion of walls surrounding the lens in the vicinity of the end of the support to flow to bridge a first gap between the lens and the walls of the support and a second gap between the lens and the annular wall.

12. The method of claim 10, further comprising distributing particulates of a refractory material in the predetermined clearance between the support and the optical element; wherein the step (c) of applying of sufficient heat, comprises causing the viscosity of the particulates to reduce in viscosity so that they form at least one bridge between the optical element and the support; and the step (d) of allowing the heated region to cool, comprises cooling the at least one bridge to affix the optical element to the support.

13. A method of making an optical apparatus for use in a high temperature environment, the method comprising:
(a) selecting an optical element comprising a refractory body transparent to electromagnetic radiation;
(b) supporting the selected optical element on a support for the element, the support comprising a refractory material having reduced viscosity when heated to a temperature exceeding the temperature of the high temperature environment;
(c) applying sufficient heat only to a periphery of the body of the optical element and a nearby surface of the support to cause a portion of the nearby surface of the support to become less viscous and flow into contact with the peripheral edge of the optical element, said applying of sufficient heat without significant heat-induced distortion of the optical properties of the optical element; and
(d) allowing the heated region to cool so that the optical element is affixed to the support.

14. The method of claim 13, wherein the supplying of sufficient heat comprises applying heat to cause a nearby surface of the support to become less viscous and shrink into contact with the peripheral edge of the optical element.

15. An optical apparatus for use in a high-temperature environment, the apparatus comprising a substantially cylindrical refractory support, the support having a front end adapted for supporting an optical element; an optical element comprising a body of a refractory material flint is transparent to electromagnetic radiation, the body supported in the front end of the support;

wherein the optical element is fused to the support by solidified material formed by heat-induced encroachment of internal surface portions of the support around peripheral edges of the optical element.

16. The apparatus of claim 15, wherein the optical element comprises a body of vitreous silica.

17. The apparatus of claim 15, wherein the support comprises vitreous silica.

18. The apparatus of claim 15, wherein the optical element is affixed to inner walls of the support by at least three bridges, the bridges formed of a refractory material, the bridges formed by melting particulates of refractory material and allowing the material to harden.

19. The apparatus of claim 18, wherein the bridges comprise vitreous silica.

20. The apparatus of claim 18, wherein the optical element comprises vitreous silica, and the support comprises vitreous silica.

* * * * *

UNITED STATES PATENT AND TRADEMARK OFFICE
CERTIFICATE OF CORRECTION

PATENT NO. : 5,732,166
DATED : March 24, 1998
INVENTOR(S) : O. Hamann et al.

It is certified that error appears in the above-identified patent and that said Letters Patent is hereby corrected as shown below:

| COLUMN | LINE | |
|---|---|---|
| 13 | 5 | "flint" should read --that-- |
| (Claim 15, | line 5) | |

Signed and Sealed this

Twenty-third Day of June, 1998

Attest:

BRUCE LEHMAN

Attesting Officer   Commissioner of Patents and Trademarks